Aug. 28, 1962 R. R. GRIFFEN 3,051,193
FUEL INLET VALVE
Filed Aug. 3, 1959
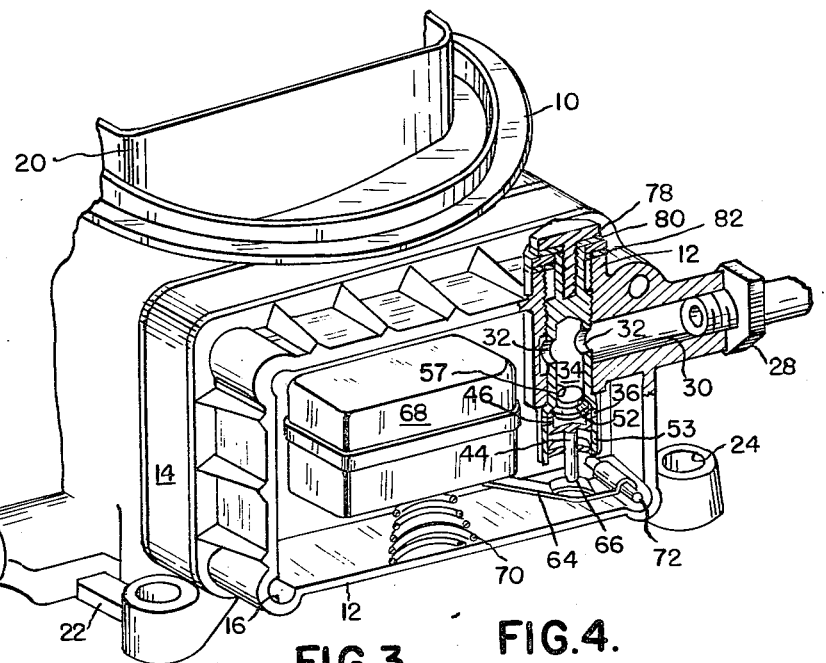
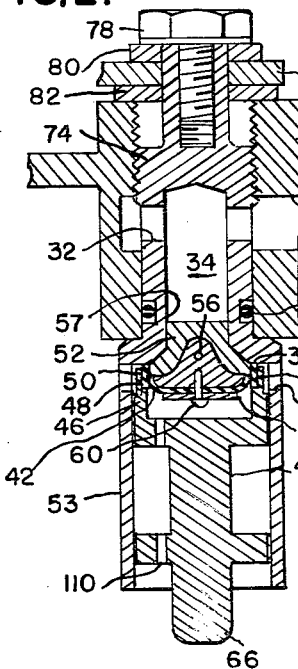
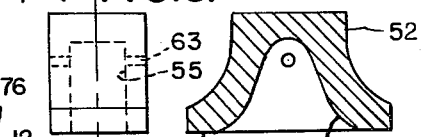
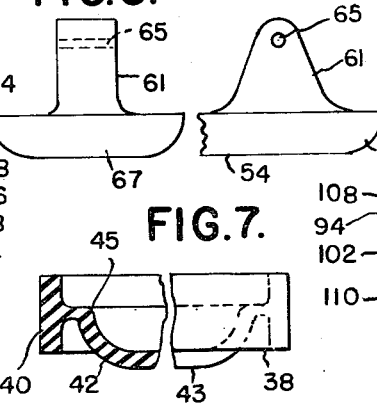
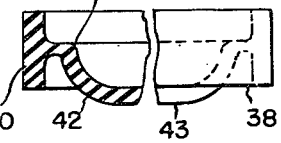
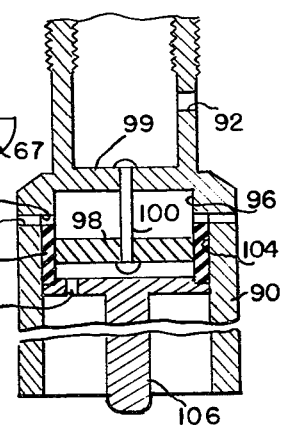
*INVENTOR.*
RALPH R. GRIFFEN
BY *Whittemore*
*Hulbert & Belknap*
ATTORNEYS

United States Patent Office 3,051,193
Patented Aug. 28, 1962

3,051,193
FUEL INLET VALVE
Ralph R. Griffen, Roseville, Mich., assignor to Holley Carburetor Company, Van Dyke, Mich., a corporation of Michigan
Filed Aug. 3, 1959, Ser. No. 831,232
11 Claims. (Cl. 137—450)

This invention relates to fuel transmission systems and is particularly applicable to those of the type employing a control unit in a carburetion system. More particularly, this invention relates to an improved float controlled valve unit for the fuel inlet of a carburetor system.

The invention provides a float controlled valve which will insure a substantially constant liquid level in a fuel bowl under all operating conditions which the carburetor system will encounter. Conventional intake needle valve and float units for the carburetion systems of internal combustion engines are subject to many shortcomings. These stem from inherent structural and operating characteristics of the unit and from unavoidable changes in operating conditions which take place within the system. The annular valve seat of the valve unit controlling the intake of fuel to the float bowl constitutes a restriction which limits the rate of fuel flow possible at any given pressure. At high flow rates, when the output pressures of the conventional fuel supply pump drop off and also in the presence of a considerable amount of vapor when the liquid fuel is hot, the flow of fuel may well drop below operating requirements thus undersupplying the flow vessel.

This problem has particularly been encountered by high horsepower engines wherein the annular valve seat has been enlarged so that the inlet fuel pressure works over a larger area to lower the requisite blow off pressure. The enlargement of the valve seat in order to pass the required large volume of fuel as demanded by high horsepower engines has created an additional problem since the valve seat is larger than can readily be shut off by conventional float leverage systems in the space allotted by normal fuel bowls.

The invention overcomes the objections noted above by affording an improved fuel inlet valve and float assembly which is simple, economical and rugged in character and readily applicable to existing carburetion systems to greatly enhance their efficiency under all conditions of operation.

Generally considered, in accordance with the principle of the invention, the float leverage system creates a force, the greater part of which is used for sealing off the fuel inlet line. The leverage system also overcomes the smaller forces created by the fuel line pressure acting on the valve member which is carried by the piston on which the float leverage system acts. By utilizing such an arrangement, greater volumes of fuel may be handled as well as lower leverage floats may also be employed.

It is an object of this invention to provide an improved float controlled valve unit.

Another object of the invention is to provide an improved float controlled valve unit for the fuel inlet of a carburetor system.

A further object of the invention is to provide an improved float controlled shut off valve unit without sacrificing valuable space for larger leverage systems.

A still further object of the invention is to provide a control valve which has a larger valve seat to handle an increased volume of fuel and which obviates the necessity of requiring larger float leverage systems.

Still another object of the invention is to provide a control valve having larger flow while utilizing the same force or a smaller force for sealing off the fuel inlet line from the receiver unit.

Another object is to provide a simple, economical and rugged fuel inlet valve and float assembly readily applicable to existing carburetion systems and contributing to their efficiency, reliability and long life under all conditions of operation, as well as ease of maintenance.

Further objects and advantages of the present invention will be apparent from the following description, reference being had to the accompanying drawings wherein a preferred form of the present invention is clearly shown.

FIG. 1 is a vertical sectional view of the carburetor employing the present invention;

FIG. 2 is an enlarged sectional view of the control valve per se shown in a closed position;

FIG. 3 is an enlarged side view of the body member;

FIG. 4 is a sectional view taken on line 4—4 of FIG. 3;

FIGURES 5 and 6 are the enlarged front and side views respectively of the pressure absorbing member;

FIG. 7 is a front sectional view of the valve member;

FIG. 8 is a modification of the control valve and is shown in an open position.

In FIG. 1, there is shown a partial, sectional view of a carburetor comprising a main body 10 to which a fuel bowl 12 is attached. The fuel bowl 12 is an elongated body having an outer wall, top, bottom and end walls and being open on its inner side. It is attached to the side of a metering body 14 and the metering body 14 and bowl 12 are attached to the main body 10 by suitable fastening means, such, for example, as screws (not shown) passing through openings 16 provided in the fuel bowl 12 so as to clamp the open sided bowl member against the main body 10 and thus to provide a bowl unit which is completely enclosed.

The metering body 14 is provided with suitable openings provided for the passage of fuel to the main nozzle, idling and transfer ports, etc. The present invention is concerned with the float controlled valve which is placed in the inlet line in the fuel bowl. Thus, in the assembly, best illustrated in FIG. 1, the main body 10 includes an upwardly extending collar 20 in which a choke valve (not shown) is pivotally mounted and conventional automatic choke mechanism may be provided, the actuating mechanism being included in the choke housing.

The carburetor body has the mixing chamber (not shown) which includes the main venturi and the throttle valve (not shown). When the throttle valve is closed, enough fuel flows from the idle port to keep the engine operating. A body flange 22 is provided with holes 24 so as to retain fastening means (not shown) which secure the carburetor to the manifold of an internal combustion engine.

As shown in FIGURES 1 and 2, fuel from an external source (not shown), such as a fuel pump, is supplied through a fitting 28 to a chamber 30 and thence through inlet port 32, passage 34 and across a restriction and finally to the interior of the bowl 12.

Referring to FIGURE 2 which shows the valve in a closed position, the flow of fuel through the passage 34 to an outlet passage or port 36 is controlled by a fuel inlet valve member 38 (see FIG. 7) having an upwardly extending seal portion 40 integrally connected with a diaphragm portion 42. The valve member 38 may be composed of a rubber base composition seal 40 integrally molded with the diaphragm portion 42 which may also be of the same material. It should be understood that other types of material may be utilized in order to accomplish the purposes of this invention. The diaphragm portion 42 has a flat section 43 and a curvilinear section 45, which extends from the flat section 43 to the upwardly extending seal portion 40. The valve member 38 is carried by a piston 44 which has a cup-shaped end portion 46 on one end of the piston 44. The seal portion 40 of the valve member 38 is carried on a piston edge 48 and secured to an upwardly extending piston portion 50. The diaphragm 42 of valve member 38 is fixed to pressure absorbing member 54, and is permitted to flex or bend upon opening or closing movement of seal portion 40 relative to the valve seat 39 as will be explained in detail later.

A body member 52 (see FIGS. 3 and 4) of the bowl valve body 53 is fixedly located across the passage 34. The pressure absorbing member 54 is connected to the body member 52 by pin means 56. The pressure absorbing member 54 is located in the passage 34 and forms a pressure chamber 57 in the passage 34. The valve member 38 surrounds and engages the absorbing member 54 and controls the flow from the pressure chamber 57 to the outlet port 36. As shown in FIG. 2, a diaphragm retainer washer 58 is positioned on the underside of the diaphragm portion 42 of the valve member 38 which is subject to pressure. A pin 60 is utilized to permanently secure the diaphragm retainer washer 58 and the flat section 43 of the diaphragm portion 42 to the pressure absorbing member 54.

A restrictive valve seat 39 is formed in the valve body 53 between the pressure chamber 57 and outlet port 36. Fuel passing the valve seat 39 enters the interior of the fuel bowl 12 through the port 36 provided in the valve body 53.

The fuel in the bowl 12 is maintained at a constant level by a valve actuating float arm 64 engageable with an extension 66 of the valve member 44. The valve actuating float arm 64 is engaged on its outer end by a float 68. Associated with the float 68 is a compression spring 70 urging the float 68 upwardly in a valve closing direction. The other end of the valve actuating float arm 64 is pivotally connected to a pivot pin 72 which is secured to the outer wall of the fuel bowl 12.

It will be observed that upward force applied to the float 68 either by buoyancy or by the action of the compression spring 70 tends to rock the float arm 64 clockwise about the pivot means 72 so as to close the valve port 36 to the inlet passage 34. When the level of the fuel in the fuel bowl 12 drops, the float 68 moves downwardly so as to move the lever arm 64 in a counterclockwise direction thereby permitting the valve piston 44 to move downwardly and thereby opening the valve member 38 to permit fluid to leave the chamber 57.

The valve body 53 has a reduced upper portion 74 which threadedly engages the bowl 12. The reduced upper portion 74 is threadedly adjustable within the bowl housing which constitutes part of the fuel bowl 12. The external means located on the outside of the fuel bowl 12 provides for an adjusting nut 76, locking nut 78, and a seal 80 interposed between the locking nut 78 and the adjusting nut 76. A seal 82 is also provided in between the top of the fuel bowl 12 and the adjusting nut 66. When it is required or desirable to change the location of the inlet port 32 with reference to the float lever 64, the locking nut 78 is unfastened, the adjusting nut 76 is removed and the valve body 53 threadedly rotated in the bowl 12, thereby changing the location of the inlet port 32 with reference to the float lever 64. At the new position the adjusting nut 76 is again properly located and the locking nut 78 is adequately fastened to the valve body. An appropriate O ring 84 is provided so as to prevent leakage from the place where the reduced upper portion 74 of the body 53 is inserted into the bowl 12.

FIGS. 3–7 show the main parts of the valve. The body member 52 has a cut-out portion 55 in which is inserted the upper part 61 of the pressure absorbing member 54. Pin means 56 extend through the openings 63 and 65 provided in the pressure absorbing member 52 and the upper part 61 of the pressure absorbing member 54 respectively. The lower part 67 of the pressure absorbing member 54 engages when in an assembled position diaphragm portion 42 of the valve 38. The diaphragm portion 42 surrounds and engages the lower part 67 and abuts against lower edge 59 located on the body member 52 as is shown in FIG. 2.

A modification of this invention is shown in FIG. 8. The valve housing 90 has an inlet port or passage 92 and an outlet port or passage 94, both of said passages communicating with a pressure chamber 96. A pressure absorbing member 98 is spaced at one end of the pressure chamber 96 and is fixed to the housing extension member 99 by pin means 100. The extension member 99 is located across the chamber 96. Fluid travels around the member 99 to the port or passage 94. A valve member 102 surrounds the pressure absorbing member 98 and engages on one side thereof the inner wall 104 of the housing 90 and the pressure absorbing member 98 on the other side. The valve member 102 is carried by a piston 106 which reciprocates in the valve housing 90 with reference to the valve seat 108. The seat 108 is formed in the housing 90 and is in communication with the pressure chamber 96. The piston 106 is engaged on its outer end by a float actuating arm such as represented by numeral 64.

Referring to FIG. 2, in operation, as the valve member 38 approaches the closed off position where the valve member 38 engages the valve seat 39, pressure builds up on the upper portion of the valve member 38 which engages the valve seat 39. The force acting on the upper part of the valve member 38 also acts on the curvilinear section 45 of the diaphragm 42 in a direction opposing the closing of the valve seat 39. The seal area plus the curvilinear section area of the diaphragm 42 exposed to line pressure are relatively small when compared to the total area of the piston. By utilizing this unique arrangement, the pressure absorbing member 54 takes up the majority of the line pressure acting in the chamber 57 and does not permit the pressure to influence or work upon the majority of the area of piston 44. The advantage in this arrangement lies in the fact that the valve 38 may be closed by the float lever force without having to overcome the force of the fuel line pressure acting on the total piston area. The greater part of the leverage force is therefore used for sealing and not for overcoming the fuel line pressure.

It should be understood that the valve member 38 which has its area exposed to fuel line pressure may be designed in proper proportion so as to provide for the fluid forces encountered when properly closing and effectively sealing the valve seat. The weight of the piston 44 is also considered in determining the resultant sealing force. Various means may be utilized for returning the piston 44 to an open position. One way of doing this is by actually connecting the lever 64 to the piston extension 66 so that as the fuel level decreases the leverage force correspondingly decreases. Also, the weight of the piston 44 may be utilized in returning the valve 38 to an open position once the leverage force has been relieved in whole or in part. It should be observed that the piston 44 is freely suspended in the cylinder by the diaphragm retainer 58. Frictional resistance between the valve cylinder and the piston lands is minimized.

In FIG. 8, the operation of the valve is similar to the operation explained for FIG. 2. The pressure in chamber 96 acts for the most part against the inner area of the pressure absorbing piece 98. The valve member 102 has an upstanding circumferential area exposed to pressure. In order to seat the valve member 102 against the valve seat 108, the float must exert a force in an upward direction to overcome the force acting on the valve area exposed to pressure in addition to providing a force for the proper seal. This area is relatively small when compared to the entire piston area. The advantage of this arrangement lies in the fact that the valve may be closed without having to overcome the total force of the fuel line pressure acting on the entire piston area.

In FIGS. 2 and 8, bleed passages 110 are provided in each of the pistons to drain the under side of the pressure absorbing members to the interior of the fuel bowl 12 which is vented to the atmosphere.

There is thus provided a float controlled valve unit which is not only more efficient than predecessors of this type but which has been greatly reduced in cost. The construction obviates the necessity of requiring larger float leverage systems. In fact, lower leverage floats may be used when required.

The drawings and the foregoing specification constitute a description of the improved fuel inlet valve in such full, clear, concise and exact terms as to enable any person skilled in the art to practice the invention, the scope of which is indicated by the appended claims.

What I claim as my invention is:

1. A fluid valve comprising an elongated tubular body provided with an inlet port and an outlet port, an annular valve seat in said body interposed between said ports, a rigid member spanning the interior of said tubular body in between said inlet port and said valve seat, said rigid member having a width less than the width of the interior of said body to permit free flow of fluid around said rigid member, said rigid member having a recess provided in one side thereof which faces in a direction away from said inlet port, a pressure absorbing member located in said tubular body, said pressure absorbing member including a fluid barrier and a stem on one side of said barrier which is received in said recess, said fluid barrier having a peripheral surface which is spaced from the wall of said body, means connecting the stem of said pressure absorbing member to said rigid member for supporting said pressure absorbing member in a predetermined fixed position in said body, a control member movable in said body on said one side of said rigid member, and a resilient diaphragm connected between said fluid barrier and said control member, said diaphragm having a center portion in surface to surface contact with said peripheral surface and the other side of said fluid barrier, said diaphragm including an integral annular valve portion at the outer edge of said center portion, said control member being movable towards and away from said valve seat to control flow across said valve seat with said valve portion of said diaphragm.

2. A fluid valve defined in claim 1 wherein said ports are located in the wall of said body along axes extending transversely with respect to the longitudinal axis of said body.

3. A fluid valve defined in claim 1 wherein said valve seat has an axis which is coincident with the longitudinal axis of said body.

4. A fluid valve defined in claim 1 wherein the walls of said stem are in surface to surface contact with the walls of said recess.

5. A fluid valve defined in claim 1 wherein said one side of said fluid barrier is in surface to surface contact with said one side of said rigid member.

6. A fluid valve defined in claim 1 wherein said control member is in the form of a piston.

7. A fluid valve defined in claim 1 wherein said resilient diaphragm is made of rubber.

8. A fluid valve defined in claim 1 wherein the means connecting the stem of said pressure absorbing member to said rigid member includes a pin which extends transversely to the longitudinal axis of said body.

9. A fluid valve comprising an elongated tubular body provided with an inlet port and an outlet port, an annular valve seat in said body interposed between said ports, said valve seat having an axis which is coincident with the longitudinal axis of said body, a rigid member spanning the interior of said tubular body in between said inlet port and said valve seat, said rigid member having a width less than the width of the interior of said body to permit free flow of fluid around said rigid member, said rigid member having a recess provided in one side thereof which faces in a direction away from said inlet port, a pressure absorbing member located in said tubular body, said pressure absorbing member including a fluid barrier and a stem on one side of said barrier which is received in said recess, the walls of said stem being in surface to surface contact with the walls of said recess, said fluid barrier having a peripheral surface which is spaced from the wall of said body, means connecting the stem of said pressure absorbing member to said rigid member for supporting said pressure absorbing member in a predetermined fixed position in said body, a piston movable in said body on said one side of said rigid member, and a diaphragm made from a flexible material connected between said fluid barrier and said piston, said diaphragm having a center portion in surface to surface contact with said peripheral surface and the other side of said fluid barrier, said diaphragm including an integral annular valve portion at the outer edge of said center portion, said piston being movable towards and away from said valve seat to control flow across said valve seat with said valve portion of said diaphragm.

10. A fluid valve defined in claim 9 wherein said ports are located in the wall of said body along axes extending transversely with respect to the longitudinal axis of said body.

11. A fluid valve defined in claim 9 wherein said one side of said fluid barrier is in surface to surface contact with said one side of said rigid member.

References Cited in the file of this patent

UNITED STATES PATENTS

| | | |
|---|---|---|
| 559,884 | Birkery | May 12, 1896 |
| 1,321,673 | Sayward | Nov. 11, 1919 |
| 1,833,583 | Macauley | Nov. 24, 1931 |
| 2,715,415 | Tucker | Aug. 16, 1955 |

FOREIGN PATENTS

| | | |
|---|---|---|
| 264 | Great Britain | Jan. 5, 1905 |
| 103,507 | Sweden | Jan. 13, 1942 |